(12) United States Patent
Rolland et al.

(10) Patent No.: US 8,048,519 B2
(45) Date of Patent: Nov. 1, 2011

(54) HIGHLY FLAME RETARDANT PANELS

(75) Inventors: Loic Pierre Rolland, Divonne les Bains (FR); Sebastien Tindilliere, Geneva (CH)

(73) Assignee: E.I. du Pont de Nemours and Company, Wilmington, DE (US)

( * ) Notice: Subject to any disclaimer, the term of this patent is extended or adjusted under 35 U.S.C. 154(b) by 520 days.

(21) Appl. No.: 12/331,896

(22) Filed: Dec. 10, 2008

(65) Prior Publication Data

US 2009/0155584 A1 Jun. 18, 2009

Related U.S. Application Data

(60) Provisional application No. 61/014,111, filed on Dec. 17, 2007.

(51) Int. Cl.
*G11B 5/64* (2006.01)

(52) U.S. Cl. .......................... 428/336; 442/136; 442/414

(58) Field of Classification Search .................. 428/336; 442/136, 414
See application file for complete search history.

(56) References Cited

U.S. PATENT DOCUMENTS

| 4,851,463 | A | 7/1989 | Opsahl |
| 5,017,637 | A | 5/1991 | Smith |
| 5,498,482 | A | 3/1996 | Buchner |
| 6,753,372 | B1 | 6/2004 | Duran |
| 7,547,650 | B2 * | 6/2009 | Keep ............................ 442/414 |
| 2005/0215695 | A1 | 9/2005 | Goossens |
| 2006/0264549 | A1 | 11/2006 | Rollan |

FOREIGN PATENT DOCUMENTS

| EP | 0284939 A2 | 10/1988 |
| EP | 0673968 A1 | 9/1995 |
| WO | 90/14944 A | 12/1990 |
| WO | 2006/124658 A1 | 11/2006 |

* cited by examiner

*Primary Examiner* — Terressa Boykin

(57) ABSTRACT

A flame retardant panel structure comprises at least one external metal layer, one or more tie layers comprising one or more functionalized polymers, and a core layer made of a fabric made of glass fibers. The flame retardant panel structure shows comparable flame retardancy properties while being manufactured at reasonable costs with conventional processes such as for example extrusion or calendering. The flame retardant panel structures can be used in applications where flame retardancy and/or fire protection is needed, such as for example in building and construction applications, automotive or railways applications, medical equipments and luggage.

20 Claims, No Drawings

HIGHLY FLAME RETARDANT PANELS

This application claims priority to U.S. provisional application Ser. No. 61/014,111, filed Dec. 17, 2007; the entire disclosure of which is incorporated herein by reference.

The present invention relates to flame retardant panels which are designed for use in an environment where flame retardancy and/or fire protection is required.

BACKGROUND OF THE INVENTION

For panels used in building and construction applications, flame retardant materials are desirable to protect against the spread of fire. Flame retardant panels are often used to cover the external as well as internal surfaces of buildings and usually have a "sandwich" structure, the two external layers being made of metal and the intermediate layer of a flame retardant composition as described in the next paragraph below.

Important characteristics for flame retardant compositions for construction panels are high flame retardancy, good heat performance and good mechanical properties. Today, typical flame retardant compositions suitable for the manufacture of building panels are based on blends of polyethylene (PE) and/or ethylene vinyl acetate (EVA) with up to about 75 wt-% of a flame retardant additive such as aluminum trihydrate (ATH) and/or magnesium hydroxide. With the aim of meeting high demanding government test standards, such as for example DIN 4102 Class A2, many improvements have been achieved to improve the flame retardancy of the compositions by highly increasing the amount of flame retardant additives (up to about 90 wt-%). While the incorporation of such high amounts of flame retardant additives confers to the composition a high flame retardancy, such compositions have several drawbacks. The incorporation of such high amounts of flame retardant additives leads not only to the deterioration of the mechanical properties of the thermoplastic polymer (the plastic becomes e.g. brittle, losing elasticity in comparison with the starting polymer, which is a disadvantage for many applications) but also leads to difficulties in the manufacture of the composite panels. With increasing the amount of the flame retardant additives, the thermoplastic composition has poor processing characteristics and thus cannot be processed by conventional means such as for example extrusion or calendering. With such elevated amount of flame retardant additives in the thermoplastic compositions, flame retardant composite panels are manufactured by bonding together the aluminum sheets and the thermoplastic composition using an adhesive polymer and a process such as a flat bed lamination with the use of appropriate heat and pressure conditions.

On the other hand, there is also a general desire in building and construction applications to be cost efficient. Flame retardant agents such as ATH are expensive so that typical flame retardant compositions which include high amounts of these compounds may become expensive. The elevated costs of the flame retardant additives such as ATH or magnesium hydroxide as well as the complexity and investment cost of the needed manufacturing processes render the production of these composite panels unattractive.

There is thus a need for flame retardant panels that exhibit high flame retardancy and which can be manufactured at reasonable costs with conventional processes.

SUMMARY OF THE INVENTION

It has been surprisingly found that the above mentioned problems can be overcome by a flame retardant panel structure comprising:

(i) at least one external metal layer;
(ii) one or more tie layers comprising one or more functionalized polymers; and
(iii) a core layer made of a fabric made of glass fibers.

If compared with the flame retardant panels of the state of the art which meet high demanding government test standards, such as for example DIN 4102 Class A2, the flame retardant panel structure of the present invention shows comparable flame retardancy properties while being manufactured at reasonable costs with conventional processes such as for example extrusion or calendering.

DETAILED DESCRIPTION OF THE INVENTION

The at least one external metal layer of the flame retardant panel structure according to the present invention can be made of any metal suitable for structures used in applications where flame resistance is required and can be chosen, for example, among aluminum, stainless steel, copper, steel, brass and alloys thereof. The metal layer confers to the flame retardant panel structure itself strength and stiffness, resistance to various weather conditions, additional flame retardancy and aesthetical appearance without substantially increasing its overall weight. Aluminum is preferably used due its light weight, corrosion resistance and durability. When one external metal layer is used in the panel structure according to the present invention, it is adjacent to one of the one or more tie layers comprising one or more functionalized polymers. When two external metal layers are used in the panel structure according to the present invention, each of them is adjacent to one of the one or more tie layers thus sandwiching the core. The thickness range of the at least one external metal layer is preferably between 100 and 500 μm.

By one or more tie layers, it is meant that i) one or more tie layers are situated between the external metal layer and the core layer, wherein the tie layers are adjacent to each other(s) or ii) one or more tie layers are situated on both side of the core layer, wherein the tie layers are adjacent to each other(s). The one or more tie layers of the panel structure according to the present invention comprise one or more functionalized polymers. By "functionalized polymer", it is meant that the polymer, which can be a homopolymer, a copolymer or a terpolymer, is grafted and/or copolymerized with organic functionalities. The one or more functionalized polymers used in tie layers of the flame retardant panel structure according to the present invention are preferably selected from the group consisting of anhydride-functionalized polymers (a), ethylene acid copolymers (b), copolymers comprising copolymerized units of ethylene and a comonomer selected from the group consisting of $C_4$-$C_8$ unsaturated anhydrides, monoesters of $C_4$-$C_8$ unsaturated acids having at least two carboxylic acid groups, diesters of $C_4$-$C_8$ unsaturated acids having at least two carboxylic acid groups (c) and mixtures thereof. The presence of carboxylic acid or anhydride functionality is required to have a strong adhesion with the one or more external metal layers.

Anhydride-grafted polymers (a) that are suitable for use as components of the one or more tie layers are anhydride-grafted polymers. Preferably, anhydride-grafted polymers include polymers that have been grafted with from about 0.01 to about 3 wt-% of an unsaturated dicarboxylic acid anhydride, preferably from about 0.05 to about 1 wt-%, the weight percentages being based on the total weight of the anhydride-grafted polymer. Grafting agents include unsaturated dicarboxylic acid anhydrides such as maleic anhydride, citraconic anhydride, itaconic anhydride and tetrahydrophthalic anhydride, with maleic anhydride being preferred. The polymers that are grafted may be homopolymers, copolymers or terpolymers. Preferably, the one or more anhydride-grafted polymers are anhydride-grafted polyolefins. Examples include grafted polyethylene, polypropylene, ethylene alpha-olefin, ethylene alkyl (meth)acrylate copolymers, ethylene vinyl acetate copolymers, ethylene propylene diene methylene copolymers (EPDM), styrene ethylene butadiene styrene (SEBS) copolymers and styrene butadiene styrene (SBS) copolymers. "Alkyl (meth)acrylate" refers to alkyl acrylate and/or alkyl methacrylate. Preferred anhydride-grafted polymers are chosen among grafted polyethylene, grafted polypropylene, grafted ethylene vinyl acetate copolymers, grafted ethylene alkyl (meth)acrylate copolymers and mixtures thereof.

Polyethylenes used for preparing maleic anhydride grafted polyethylene (MAH-g-PE) are commonly available polyethylene resins selected from HDPE (density higher than 0.94 g/cm$^3$), LLDPE (density of 0.915-0.925 g/cm$^3$) LDPE (density of 0.91-0.94 g/cm$^3$) and metallocene polyethylenes. Polypropylenes used for preparing maleic anhydride grafted polypropylene (MAH-g-PP) include homopolymers, random copolymers, block copolymers and terpolymers of propylene. Copolymers of propylene include copolymers of propylene with other olefins such as 1-butene, 2-butene and the various pentene isomers. Ethylene alpha-olefins copolymers comprise ethylene and one or more alpha-olefins. Examples of alpha-olefins include but are not limited to propylene, 1-butene, 1-pentene, 1-hexene-1,4-methyl 1-pentene, 1-heptene, 1-octene, 1-nonene, 1-decene, 1-undecene and 1-dodecene. Ethylene alkyl (meth)acrylate copolymers are thermoplastic ethylene copolymers derived from the copolymerization of ethylene comonomer and at least one alkyl (meth)acrylate comonomer, wherein the alkyl group contains from one to ten carbon atoms and preferably from one to four carbon atoms. When an ethylene alkyl (meth)acrylate copolymer is used in the one or more tie layers of the panel structure according to the present invention, it is preferably chosen among ethylene methyl (meth)acrylate copolymers, ethylene ethyl (meth)acrylate copolymers, ethylene butyl (meth)acrylate copolymers, or combinations of two or more thereof.

The term "ethylene propylene diene elastomers (EPDM)" is used herein to mean any elastomer that is a terpolymer of ethylene, at least one alpha-olefin, and a copolymerizable non-conjugated diene such as norbornadiene, 5-ethylidene-2-norbornene, dicyclopentadiene, 1,4-hexadiene and the like.

Ethylene acid copolymers (b) may be prepared by copolymerization of ethylene and an $\alpha,\beta$-unsaturated $C_3$-$C_8$ carboxylic acid. Preferably, the ethylene acid copolymers for use in the one or more tie layers of the panel structure of the invention are ethylene acrylic acid copolymer (EAA), ethylene methacrylic acid copolymer (EMAA) ethylene maleic acid monoethylester copolymer (EMAME), or mixtures thereof. Preferably, the ethylene acid copolymers comprise from about 1 to about 30 wt-%, more preferably from about 2 to about 10 wt-%, of the $\alpha,\beta$-unsaturated $C_3$-$C_8$ carboxylic acid, the weight percentages being based of the total weight of the ethylene acid copolymer. Ethylene acid copolymers also include higher order copolymers such as terpolymers which can be described as E/X/Y copolymer where E is ethylene, X can be at least one $\alpha,\beta$-unsaturated $C_3$-$C_8$ carboxylic acid such described above, and Y is a softening comonomer such as alkyl acrylate, alkyl methacrylate, or combinations thereof. X can be present from about 3 to about 30 wt-%, preferably from about 4 to about 25 wt-%, and more preferably from about 5 to about 20 wt-%, and Y is from 0 to about 35 wt-%, preferably from about 0.1 to about 35 wt-%, and more preferably from about 5 to 30 wt-%, the weight percentages being base on the total weight of the E/X/Y copolymer.

The third class of functionalized polymers that may be used in the one or more tie layers of the flame retardant panel structure according to the present invention are polymers comprising copolymerized units of ethylene and a comonomer selected from the group consisting of $C_4$-$C_8$ unsaturated anhydrides, monoesters of $C_4$-$C_8$ unsaturated acids having at least two carboxylic acid groups, diesters of $C_4$-$C_8$ unsaturated acids having at least two carboxylic acid groups and mixtures of such copolymers. The ethylene copolymer will generally comprise from about 0.5 wt-% to about 25 wt-% copolymerized units of the comonomer. The copolymer may be a dipolymer or a higher order copolymer, such as a terpolymer or tetrapolymer. The copolymers are preferably random copolymers. Examples of suitable comonomers of the ethylene copolymer include unsaturated anhydrides such as maleic anhydride and itaconic anhydride; $C_1$-$C_{20}$ alkyl monoesters of butenedioic acids (e.g. maleic acid, fumaric acid, itaconic acid and citraconic acid), including methyl hydrogen maleate, ethyl hydrogen maleate, propyl hydrogen fumarate, and 2-ethylhexyl hydrogen fumarate; $C_1$-$C_{20}$ alkyl diesters of butenedioic acids such as dimethylmaleate, diethylmaleate, and dibutylcitraconate, dioctylmaleate, and di-2-ethylhexylfumarate. Of these, maleic anhydride, ethyl hydrogen maleate and methyl hydrogen maleate are preferred. Maleic anhydride and ethyl hydrogen maleate are most preferred. Higher order copolymers that are examples of the ethylene copolymer component include terpolymers such as ethylene/methyl acrylate/ethyl hydrogen maleate, ethylene/butyl acrylate/ethyl hydrogen maleate and ethylene/octyl acrylate/ethyl hydrogen maleate.

The thickness range of the tie layer is preferably between 10 and 500 μm and more preferably between 30 and 90 μm.

The core layer of the flame retardant panel structure according to the present invention is made of a fabric of glass fibers. The core layer can be a non-woven, a unidirectional or a woven fabric of glass fibers provided the fact that the fabric is resistant in respect to the deterioration or the delamination. Moreover, with the same requirement of being resistant to the deterioration or the delamination, it is preferred that the surface of the fabric is planar enough so as to have a good adhesion between all layers. Preferably, the core layer of the flame retardant panel structure according to the present invention is made of a fabric of glass fibers that is a woven fabric of glass fibers, wherein the glass fibers are E-glass filaments with a diameter between 0.5 and 300 μm and preferably with a diameter between 5 to 30 μm. The thickness range of the core layer made of a fabric of glass fibers is preferably between 2 and 5 mm and more preferably between 3 and 4 mm.

With the aim of reducing the amount of smoke and heat generated during burning and to reduce the burning rate, the fabric of glass fibers used in the core layer can be impregnated with a phenolic resin.

With the aim of further improving the flame retardancy of the panel structure according to the present invention, the one or more tie layers may further comprise a non-reactive inorganic filler. By "non-reactive filler", it is meant a filler that does not react with the organic functionalities, i.e. the anhydride and acidic functions of the polymer used in the tie layer. Examples of non-reactive filler include but are not limited to silica, talcum, calcinated clay, mica and zinc borate. The inert filler is preferably present in an amount from 20 to 80 wt-%, and more preferably from about 40 wt-% to about 60 wt-%, the weight percentage being based on the total weight of the tie layer.

The one or more tie layers used in the flame retardant panel structure of the invention may further comprise common additives such as antioxidants, carbon black, UV stabilizers, lubricants, antiblocking agents, antistatic agents, waxes, pigments, titanium dioxide and other processing aids known in the polymer compounding art. These additives may be present in the composition of the one or more tie layers in amounts and in forms well known in the art.

Should the surface of the core layer be not planar enough to have a good adhesion between all layers, one or more additional layers can be added between the one or more tie layers and the core layer. With the aim of further improving the flame retardancy of the panel structure according to the present invention, the one or more additional layers preferably comprise a flame retardant composition. Typical flame retardant compositions are based, for example, on blends of polyethylene and/or ethylene copolymers with a flame retardant additive such as aluminum trihydrate and magnesium hydroxide and optionally with an inert filler such as example calcium carbonate, talcum, calcinated clay, mica or zinc borate. Examples of flame retardant compositions that can be used in the one or more additional layers can be found in WO 2006124658 and in U.S. Pat. No. 7,279,520. Should the adhesion between the one or more additional layers and the core layer be insufficient, one or more conventional adhesive layers can be added between them.

With the aim of increasing the scratch and scuff resistance of the flame retardant panel according to the present invention, such panel may further comprise an outside layer that is adjacent to an external metal layer thus facing the environment and protecting the flame retardant panel structure against weathering conditions. Such outside layer may comprise or may be made with an ionomeric composition. Ionomers, their use and advantages as scratch and scuff resistant top layers are described in EP 0730622 or WO95/07178.

The compositions used in the one or more tie layers and the compositions used in the one or more additional layers may be obtained by combining the polymeric components and non-polymeric ingredients by using any melt-mixing method known in the art. For example, the polymeric components and non-polymeric ingredients may be added to a melt mixer, such as, for example, a single or twin-screw extruder; a blender, a single or twin-screw kneader, a Haake mixer, a Brabender mixer, a Banbury mixer, or a roll mixer, either all at once through a single step addition, or in a stepwise fashion, and then melt-mixed. When adding the polymeric components and non-polymeric ingredients in a stepwise fashion, part of the polymeric components and/or non-polymeric ingredients are first added and melt-mixed with the remaining polymeric components and non-polymeric ingredients being subsequently added and further melt-mixed until a well-mixed composition is obtained.

The one or more tie layers and the one or more additional layers can be manufactured either directly by melt blend extrusion as described above, or alternatively by preparing the compositions which are subsequently processed by means of any conventional technology such as extrusion, calendering and hot lamination.

The flame retardant panel structure according to the present invention can be manufactured by means of conventional processes like for example pre-laminating or extrusion coating the polymeric material of the tie layer(s) onto the core layer prior to laminating the so obtained multilayer with the external metal layer(s).

When the flame retardant panel structure according to the present invention comprises one or more additional layers (e.g. made of a flame retardant composition) between the tie layer(s) and the core layer, such panel structure can be manufactured by means of conventional processes like for example a) laminating or extrusion coating the flame retardant composition onto the core layer prior to laminating or extrusion coating the polymeric material of the tie layer(s) onto the so obtained multilayer prior to laminating the so obtained multilayer with the external metal layer(s) or b) co-extrusion coating the flame retardant composition and the polymeric material of the tie layer(s) onto the core layer prior to laminating the so obtained multilayer with the external metal layer(s).

When the flame retardant panel structure according to the present invention comprises one or more conventional adhesive layers between the additional layer(s) and the core layer, such panel structure can be manufactured by means of conventional processes like for example a) laminating or extrusion coating the conventional adhesive layer(s) onto the core layer prior to the extrusion or lamination process or b) co-extrusion coating the flame retardant composition with the conventional adhesive onto the core layer prior to laminating or extrusion coating the polymeric material of the tie layer(s) onto the so obtained multilayer prior to laminating the so obtained multilayer with the external metal layer(s).

Alternatively, the flame retardant panel structure of the present invention can be manufactured by a process including a hydraulic press allowing proper control of temperature and pressure.

Because of their high flame retardancy, the flame retardant panel structures according to the present invention are particularly suitable in several applications where flame resistance and/or fire protection is required. Examples of such applications include building and construction components, e.g. panels for facades, interior walls, visual displays, floors, dividing/partition or/and decorative walls; furniture; and vehicles components for automotive, railways, medical equipment and luggage.

EXAMPLES

The following materials were used for preparing the samples according to the present invention and comparative ones:

Copolymer A: an ethylene methyl acrylate copolymer (24 wt-% MA) having a MFI of 20 from E. I. du Pont de Nemours and Company (Wilmington, Del.) (DuPont).

Functionalized copolymer B: an ethylene methyl acrylate copolymer grafted with maleic anhydride (7.7 wt-% MA, 0.13 wt-% grafted maleic anhydride) from DuPont.

Functionalized copolymer C: an ethylene vinyl acetate copolymer grafted with maleic anhydride (8.1 wt-% VA, 0.13 wt-% grafted maleic anhydride) from DuPont.

ATH: Apyral® 8 from the company Nabaltec (Germany).

Fabric made of glass fibers: 3 mm thick woven fabric (Doubled LT 1700 with a unit weight of 3400 g/m$^2$) from the company Sicomin (France).

Comparative example 1 (C1): 30 wt-% of copolymer A and 70 wt-% of ATH. The blend comprising 30 wt-% of copolymer A and 70 wt-% of ATH (C1) was prepared by melt-compounding. The melt compounding was carried out on a two roll mill with batches from 250 grams at 190° C. for about twelve minutes. The product was formed into a testing plaque in a hydraulic press at 190° C. with no pressure for 1 minute, with 150 bars for about 2 minutes and then by letting the plaque cool down while maintaining the pressure of 150 bars during 15 minutes and at a rate of 10 deg/min.

Example 1 (E1): Two-layer polymer films were first prepared by co-extruding the functionalized copolymer B and the functionalized copolymer C. These films (functionalized copolymer B layer: 25 μm and functionalized copolymer C layer: 50 μm) were then pressed at 150° C. onto both side of a 3 mm thick glass fabric in a hydraulic press for about five minutes.

For comparative purposes, the Limited Oxygen Index of a commercially available composite panel (C2) that fulfils the specification DIN 4102 Class A2 meets was measured. This composite panel (C2) (commercially available from Alcan under the trademark Alucobond® A2) is made of a core comprising a polyolefinic polymer with an amount of inorganic flame retardant filler higher than 80 wt-% which is positioned between two layers of aluminum. The two layers of aluminum were mechanically removed and the Limited Oxygen Index of the core layer was measured.

The Limited Oxygen Index (LOI) was tested according to ASTM D2863. The results are shown in Table 1.

TABLE 1

| Ex No. | C1 | C2 | E1 |
|---|---|---|---|
| LOI (%) | 40 | >55 | >55 |

Table 1 shows that the sample of the invention (E1) had a higher LOI value than the comparative sample that comprised 70 wt-% of the ATH flame retardant additive (C1). The sample of the invention (E1) had an LOI value similar to the comparative sample that comprised a very high amount of fillers (C2), which comparative sample fulfils the very stringent specification DIN 4102 Class A2.

The invention claimed is:

1. A flame retardant panel structure comprising, in the order:
   (i) at least one external metal layer;
   (ii) one or more tie layers comprising one or more functionalized polymers; and
   (iii) a core layer made of a fabric of glass fibers.

2. The structure according to claim 1 wherein
   the structure comprises, in the order, (i) one external metal layer; (ii) one or more tie layers comprising one or more functionalized polymers; (iii) a core layer made of a fabric of glass fibers; and (iv) one or more additional tie layers comprising the functionalized polymer;
   the functionalized polymer is independently selected from the group consisting of (a) anhydride functionalized polymer, (b) ethylene acid copolymer, (c) copolymer comprising copolymerized units of ethylene and a comonomer, or mixtures of two or more of (a), (b), and (c); and
   the comonomer is $C_4$-$C_8$ unsaturated anhydride, monoester of $C_4$-$C_8$ unsaturated acids having at least two carboxylic acid groups, diester of $C_4$-$C_8$ unsaturated acids having at least two carboxylic acid groups, or mixtures of two or more thereof.

3. The structure according to claim 2 wherein the structure further comprises (v) one additional external metal layer and the tie layer or the additional tie layer has a thickness between 10 and 500 μm.

4. The structure according to claim 3 wherein the functionalized polymer is the anhydride-grafted polymer and the polymer of the anhydride-grafted polymer is polyethylene, polypropylene, ethylene vinyl acetate, ethylene methyl (meth)acrylate, ethylene ethyl (meth)acrylate, ethylene butyl (meth)acrylate, or mixtures of two or more thereof.

5. The structure according to claim 4 wherein the anhydride-grafted polymer is grafted with about 0.01 to about 3 wt-% of an unsaturated dicarboxylic acid anhydride, the weight % being based on the total weight of the anhydride-grafted polymer.

6. The structure according to claim 2 wherein the functionalized polymer is the ethylene acid copolymer and is ethylene acrylic acid copolymer, ethylene methacrylic acid copolymer, ethylene maleic acid monoethylester copolymer, or mixtures of two or more thereof 7. The structure according to claim 6 wherein the ethylene acid copolymer comprises from about 1 to about 30 wt-% of an α,β-unsaturated $C_3$-$C_8$ carboxylic acid, the weight % being based of the total weight of the ethylene acid copolymer.

8. The structure according to claim 5 wherein the core layer has a thickness between 2 and 5 mm.

9. The structure according to claim 8 wherein each of the external metal layer and the additional metal layer is independently aluminum, stainless steel, copper, steel, brass, or alloys of two or more thereof.

10. The structure according to claim 9 wherein the external metal layer is aluminum.

11. The structure according to claim 9 the additional metal layer is aluminum.

12. The structure according to claim 11 wherein the tie layer or the additional tie layer further comprises a non-reactive inorganic filler.

13. The structure according to claim 7 wherein the tie layer or the additional tie layer further comprises a non-reactive inorganic filler and the ore layer has a thickness between 2 and 5 mm.

14. The structure according to claim 12 wherein the fabric of glass fiber is impregnated with a phenolic resin.

15. The structure according to claim 13 wherein the fabric of glass fiber is impregnated with a phenolic resin.

16. The structure according to claim 12 further comprising one or more additional layers between the core layer and the tie layer.

17. The structure according to claim 16 wherein the additional layer comprises a flame retardant composition.

18. The structure according to claim 2 further comprising an outside layer that is adjacent to the external metal layer, which outside layer is made of an ionomeric composition.

19. The structure according to claim 18 wherein the tie layer or the additional tie layer is independently grafted polyethylene, grafted polypropylene, grafted ethylene vinyl acetate copolymer, grafted ethylene alkyl (meth)acrylate copolymer, or mixtures of two or more thereof.

20. The structure according to claim 12 further comprising a base substrate which is building panel, construction panel, automotive part, railway part, or medical equipment.

* * * * *